United States Patent

Doersam, Jr.

[15] 3,668,654

[45] June 6, 1972

[54] COMMUNICATING COMPUTER

[72] Inventor: Charles H. Doersam, Jr., 4 Dogwood Hill, Brookville, N.Y. 13314

[22] Filed: Nov. 19, 1969

[21] Appl. No.: 877,995

[52] U.S. Cl. .......... 340/172.5
[51] Int. Cl. .......... G06f 3/02
[58] Field of Search .......... 353/25, 110; 340/172.5; 235/157; 200/5, 52; 178/18, 19; 350/117

[56] References Cited

UNITED STATES PATENTS

| | | | |
|---|---|---|---|
| 3,072,410 | 4/1971 | Simjian | 350/117 X |
| 3,164,674 | 1/1965 | Lally et al. | 178/19 |
| 3,443,075 | 5/1969 | Gloess | 178/19 X |
| 3,564,510 | 2/1971 | Bagley et al. | 340/172.5 |
| 3,036,291 | 5/1962 | Whittle et al. | 340/172.5 |
| 3,233,507 | 2/1966 | Baruch | 353/25 X |
| 3,234,523 | 2/1966 | Blixt et al | 340/172.5 |
| 3,252,143 | 5/1966 | Sunblad | 340/172.5 |
| 3,358,111 | 12/1967 | Dzierzbicki et al. | 200/5 X |
| 3,478,326 | 11/1969 | Bourghardt | 340/172.5 |
| 3,503,031 | 3/1970 | Nyhus et al. | 200/52 X |

*Primary Examiner*—Paul J. Henon
*Assistant Examiner*—Sydney R. Chirlin
*Attorney*—Alfred W. Barber

[57] ABSTRACT

A computer containing stored programs and stored information is programmed by selecting a series of partial commands finally assembled into a complete command. Instead of selecting commands from a great plurality of commands, one from each of a relatively few possible partial commands is selected in sequence to form the complete command. Frames carrying a sequence of these few commands are projected on a touch sensitive selection screen and selection is performed by the operator simply by touching one of the touch sensitive panels corresponding to the selected command. The computer programs the presentation of the sequence of available commands, receives and assembles the partial commands and then responds to the complete command. The completed command is an action command and may, for example, answer questions posed, send out questions to be answered by the operator, issue instructions or store information all to an appropriate terminal such as a hard copy teletypewriter.

10 Claims, 3 Drawing Figures

FIG. 1A

INVENTOR.
CHARLES H. DOERSAM JR.
BY Alfred W. Barber
Attorney

INVENTOR.
CHARLES H. DOERSAM JR.
BY Alfred W. Barber
Attorney

COMMUNICATING COMPUTER

In order to command a computer responsive to a large number of commands, all of the possible commands may be presented to the operator at one time and the operator has the problem of searching to find the command or commands he wishes executed. If a complete command is assembled from a large number of partial commands, the operator must make sure he has selected all required parts and that he has not selected an improper partial command. For example, a complete command may require five correctly selected partial commands, the operator must search for each part from a large number of possibilities; he must know what parts are required and be sure he has selected these parts and only these parts. A typical selection panel may carry 125 push-buttons from which for a given complete command he must search out and press five buttons. Or if only complete possible commands are presented the number may be very large, say 1,000, from which he must select the one he wants. Searching among 1,000 push-buttons for the desired button can be a difficult and time consuming task.

The object of the present invention is to provide a method of and means for assembling a complete command from a series of partial commands. For example, one of five partial commands is selected from each of five selection groups presented in controlled sequence. For a five-part command of the example given above, one selection at a time may be made from five selection groups of 25 each. The operator easily and quickly selects one at a time as presented from 25 possibilities presented a group at a time in predetermined sequence.

SUMMARY

In accordance with the preferred form of the present invention groups of partial commands in the form of transparencies carried by a rotating disk are projected by means of a triggered strobe light on a panel divided into a plurality of touch sensitive areas, each area corresponding to the area of one projected partial command. The operator selects one partial command from the first projected group; the projector automatically proceeds to the second group and so on until a complete command has been selected. The computer automatically rejects improper commands as, for example, when an operator touches more than one selection in a given group. In order to confirm the selection to the operator, the selected panel is lighted when the computer accepts the partial command. The touch sensitive areas are provided by suitable touch sensitive means such as, for example, a grid of ground capacity sensitive wires intersecting at the center of each area.

The computer stored program commands the presentation of the sequence of partial commands; assembles them into a complete command; checks each part for validity; feeds back an acknowledgement to the operator; and responds to the completed command.

Figures 1, 1A:
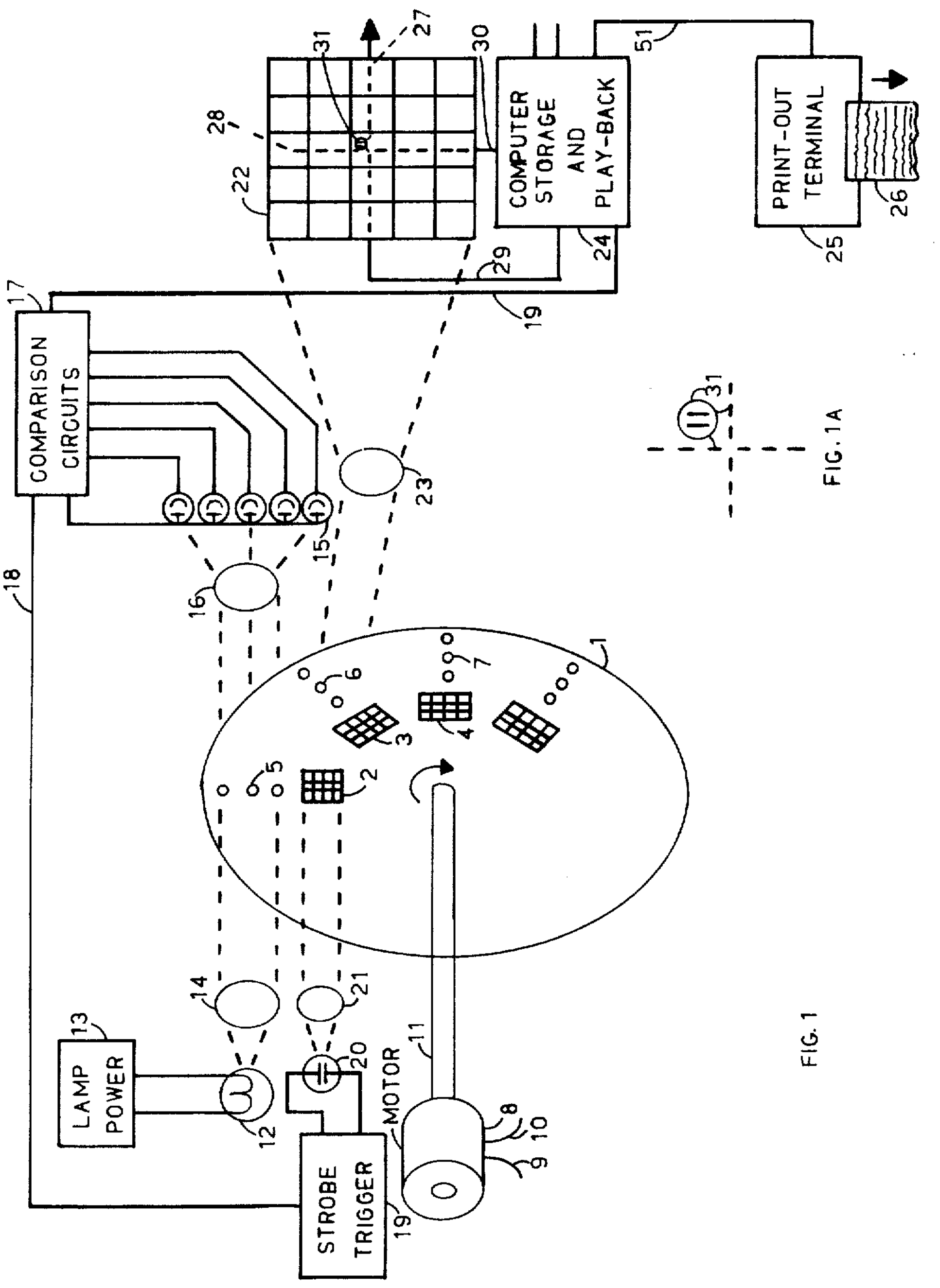
FIG. 1 is a block diagram of the preferred form of the present invention together with some circuit details.
FIG. 1A is a detail of one form of acknowledgement illumination means.

FIG. 1 illustrates in block form the essential parts of the present invention. Rotating disk 1 carries at equal radial distances a series of light transmitting panels or transparencies 2, 3, 4, etc., each containing in a predetermined format a number of partial commands to be selected and assembled into a complete command. In predetermined relationship with these panels are groups of coded holes 5, 6, and 7, one group for each transparency. Disk 1 is rotated continuously by a motor 8 receiving electric power over leads 9 and 10 and coupled to disk 1 by means of shaft 11. Light from a suitable light source, such as lamp 12 receiving power from lamp power source 13, illuminates the area of the holes through a condensing lens 14. The light passing through the coded holes is focussed on a series of photoelectric cells 15 by means of lens 16. The cells 15 are connected with a comparison circuit generally illustrated by block 17. An input from computer 24 for selecting predetermined panels is fed to comparison circuits 17 over leads 19. When the signals from cells 15 match the input signals from the computer in the comparison circuits 17, a trigger signal is sent over leads 18 to strobe trigger 19 and strobe lamp 20 is flashed. The flash of light so provided illuminates the panel 2 corresponding in position to coded holes 5 through condenser lens 21. The partial commands carried by panel 2 are projected on selector screen 22 by means of lens 23. Since disk 1 is rotated continuously and strobe lamp 20 is flashed every time coded holes 5 arrive opposite photoelectric cells 15, lamp 20 flashes once for each revolution of disk 1. Thus, if disk 1 is rotated at, say 20 revolutions per second, an apparently steadily illuminated image of panel 2 will be seen by the operator on selector screen 22.

Further operation of the system comprises selecting a desired partial command from the group thus projected on the selector screen by touching, with the finger, the area carrying the desired partial command. Computer 24 in turn, at the end of a selected series of partial commands, responds to the assembled complete command through print-out terminal 25 which prints out in hard copy on a sheet of paper 26. Selector screen 22 comprises a plurality of rectangular areas upon which the groups of partial commands are projected from the panels 2, 3, 4, etc., as described above. Any of the rectangular areas may be selected as by touching with the finger. For example, if each area is bisected in two directions by horizontal and vertical conductors two of which 27 and 28 are shown, so arranged and connected as to be touch sensitive due to the change in capacity to ground, for example, one horizontal conductor and one vertical conductor are energized at each selection. The selection is transmitted to computer 24 over the connecting leads 29, 30, etc., which stores and acknowledges each selection. A feedback signal energizes a lamp or other visual signal means 31 in the selected rectangle to show to the operator what partial command has been selected and to confirm that it is a valid selection and that it has been entered in the computer. When a partial command has been selected in this manner and has been acknowledged, the computer calls for the next predetermined group of partial commands by applying the next code to comparison circuit 17. A second partial command is then selected and so on until a full set of partial commands has been entered in the computer and in response to the final command after which the computer will execute the completed command, for example, providing questions or answers as hard copy on print-out terminal sheet 26.

Figure 2:
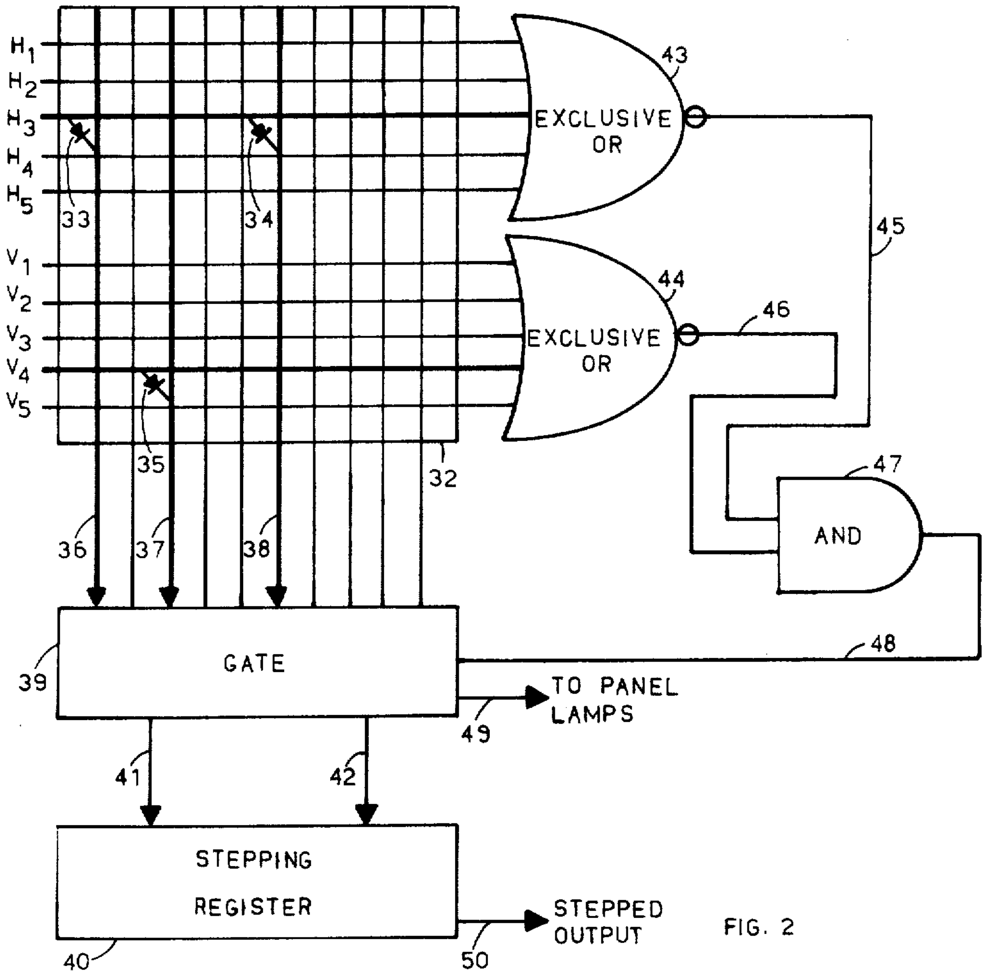
FIG. 2 is a logic diagram of the circuits associated with the selection panel.

FIG. 2 is a block diagram of an important part of the system as contained in the computer, storage and play-back unit 24. While FIG. 1 shows only one horizontal lead 29 and one vertical lead 30 there will in practice be a plurality of such leads as, for example, the five horizontal leads $H_1$ through $H_5$ and the five vertical leads $V_1$ through $V_5$. Activating any one from each group of these leads provides a coded signal for the computer. One way in which this may be accomplished is by connecting them with a diode matrix 32 in a well-known manner. For example, diodes 33, 34 and 35 as shown provide an output coded signal on leads 36, 37 and 38 to gate 39 when Lines $H_3$ and $H_4$ are activated. This coded signal is to be applied to stepping register 40 over leads 41 and 42 when gate 39 is open. Gate 39 is to be open only for a valid command which, in turn, is to be defined as a sole command. In other words two or more simultaneous commands are to be rejected as invalid. One way in which the sole command is validated is by applying all of the H lines ($H_1$ through $H_5$) to exclusive OR circuit 43 and all of the V lines ($V_1$ through $V_5$) to exclusive OR circuit 44. If only one H and one V signal exists on the exclusive OR gates, each gate will provide an output and only if these sole signals exist. The output signals indicating a valid command are applied over output leads 45 and 46 respectively to AND gate 47 which, in turn, provides an output over lead 48 to gate 39, opening this latter gate and feeding the coded signal into stepping register 40. At the same time a signal to indicate that a valid command has been generated and qualified is fed back over lead 49 to indicator lamp 31 located in the area of the rectangle showing the command selected. Thus, the operator is told that a valid command has been generated and entered and shows on the panel which command this is for instant visual qualification. Each command entered is stepped out for further utilization over lead 50. When a predetermined number of partial commands have been provided and a response is in order, signals are fed from the computer over lead 51 to apply the response to print-out terminal 25 and the response is printed in hard copy as on copy sheet 26.

When a complete series of commands have been entered as set forth above, the computer 24 (FIG. 1) is programmed internally to supply the stored response to print-out terminal 25 in a manner well-known to those skilled in the art. When thus cleared, the system is ready to process a further series of commands.

I claim:

1. In a communicating computer system in which a choice is to be made from a great plurality of available commands, command generating means including in combination;

means for presenting a great plurality of available commands in the form of a plurality of partial commands, comprising said available commands, including a command presentation panel carrying a large number of touch sensitive areas, each area adapted to receive a partial command projected thereon and wherein each partial command area is provided with a light means for showing that a corresponding partial command has been selected; and means for utilizing the selected partial commands.

2. A communicating computer command generating means as set forth in claim 1;

wherein said presentation means includes optical projection means.

3. A communicating computer command generating means as set forth in claim 1;

wherein said available commands are stored in the computer to be programmed.

4. A communicating computer command generating means as set forth in claim 1; and including invalid command rejecting means.

5. In a communicating computer system, command a generating means including in combination;

a rotatable disk carrying a plurality of transparency images each bearing a plurality of written commands;

indexing means for each of said transparencies;

means for rotating said disk at a substantially constant speed;

stroboscopic light means including triggering means responsive to said indexing means for illuminating a chosen transparency;

means for optically projecting said illuminated transparency; a screen divided into a predetermined number of touch sensitive areas for receiving the image of said projected transparency;

and means responsive to a single exclusive touch of any one of said images for initiating a computer command signal.

6. A communicating computer command means as set forth in claim 5;

wherein said indexing means includes a plurality of holes in said disk positioned in a predetermined relationship to each of said image transparencies;

and wherein said light triggering means includes means for illuminating said holes and a plurality of photoelectric cells for receiving the light passing through said holes to provide a coded signal characteristic of positions of said image transparencies during the rotational travel of said disk.

7. A communicating computer command means as set forth in claim 5;

and including visual means responsive to a valid command.

8. A communicating computer command means as set forth in claim 5;

and including means for assembling a plurality of said command signals.

9. A communicating computer command means as set forth in claim 5;

wherein the computer to be commanded contains the program for programming said stroboscopic light to project predetermined transparencies.

10. In a communicating computer system in which a selection is to be made from a great plurality of available commands, the combination of;

a display panel including a plurality of illuminable, touch sensitive subdivisions;

means for sequentially displaying a plurality of groups of partial commands on said subdivisions;

means responsive to the touch selection of a valid partial command to display another selected group of partial commands;

independent illuminating means for each of said subdivisions for indicating a selected valid partial command;

and means responsive to a completed command composed of a plurality of valid selected partial commands.

* * * * *